US012463441B2

(12) United States Patent
Mattheis et al.

(10) Patent No.: US 12,463,441 B2
(45) Date of Patent: Nov. 4, 2025

(54) CHARGER

(71) Applicant: Andreas Stihl AG & Co. KG, Waiblingen (DE)

(72) Inventors: Leonard Mattheis, Waiblingen (DE); Christian Grobe, Itzehoe (DE); Tobias Frank Rastetter, Pinneberg (DE); Nils Jakubietz, Burg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 903 days.

(21) Appl. No.: 17/587,556

(22) Filed: Jan. 28, 2022

(65) Prior Publication Data

US 2022/0247194 A1    Aug. 4, 2022

(30) Foreign Application Priority Data

Jan. 29, 2021    (EP) .................................... 21154433

(51) Int. Cl.
*H02J 7/00* (2006.01)
*G01R 19/165* (2006.01)

(52) U.S. Cl.
CPC ...... *H02J 7/0045* (2013.01); *G01R 19/16533* (2013.01); *H02J 7/0013* (2013.01)

(58) Field of Classification Search
CPC ...... H02J 7/0045; H02J 7/0013; H02J 7/0029; H02J 7/0018; H02J 7/0036; H02J 7/0047;
(Continued)

(56) References Cited

U.S. PATENT DOCUMENTS 4,849,682 A    7/1989  Bauer et al.
5,057,762 A    10/1991 Goedken et al.
(Continued)

FOREIGN PATENT DOCUMENTS

DE    10 2014 112 841 A1    3/2016
DE    20 2014 106 185 U1    5/2016
(Continued)

OTHER PUBLICATIONS

Machine translation of WO-2006123654-A1 (Year: 2006).*
(Continued)

*Primary Examiner* — Samuel Berhanu
(74) *Attorney, Agent, or Firm* — Crowell & Moring LLP

(57) ABSTRACT

A charger has a plurality of electrical interfaces, wherein a respective electrical interface is able to be coupled to an electrical energy store to be charged, in order to charge the electrical energy store to be charged. A common charge line of the charger carries a charging potential, in particular a positive charging potential, during the charging operation of the charger. A respective electrical interface includes: a first connection terminal which, when used as intended, is to be electrically connected to a corresponding connection terminal of an electrical energy store to be charged; two field-effect transistors which are looped-in in anti-serial fashion between the first connection terminal and the common charge line; and at least one control unit which is designed to drive the two field-effect transistors of a respective electrical interface such that, at any one time, the first connection terminal of only a single electrical interface is electrically connected to the common charge line via its two field-effect transistors.

7 Claims, 1 Drawing Sheet

(58) Field of Classification Search
CPC .......... G01R 19/16533; G01R 31/2621; G01R 31/327
See application file for complete search history.

(56) References Cited

U.S. PATENT DOCUMENTS

| | | |
|---|---|---|
| 10,097,928 B2 | 10/2018 | Rusconi Clerici Beltrami et al. |
| 2002/0167849 A1* | 11/2002 | Ohbayashi ............ G11C 29/832 365/189.09 |
| 2003/0169093 A1* | 9/2003 | Bruck ........................ G05F 1/56 327/432 |
| 2003/0184263 A1 | 10/2003 | Nishida et al. |
| 2007/0210751 A1 | 9/2007 | Wang et al. |
| 2009/0102424 A1* | 4/2009 | Tien ...................... H02J 7/0014 320/124 |
| 2012/0299533 A1 | 11/2012 | Huffman et al. |
| 2016/0368437 A1* | 12/2016 | Boucharel ............... B60R 16/03 |

FOREIGN PATENT DOCUMENTS

| | | |
|---|---|---|
| EP | 1 921 727 A2 | 5/2008 |
| JP | 62-64291 A | 3/1987 |

OTHER PUBLICATIONS

German-language European Search Report issued in European Application No. 21154433.3 dated Jul. 7, 2021 with partial English translation (12 pages).

* cited by examiner

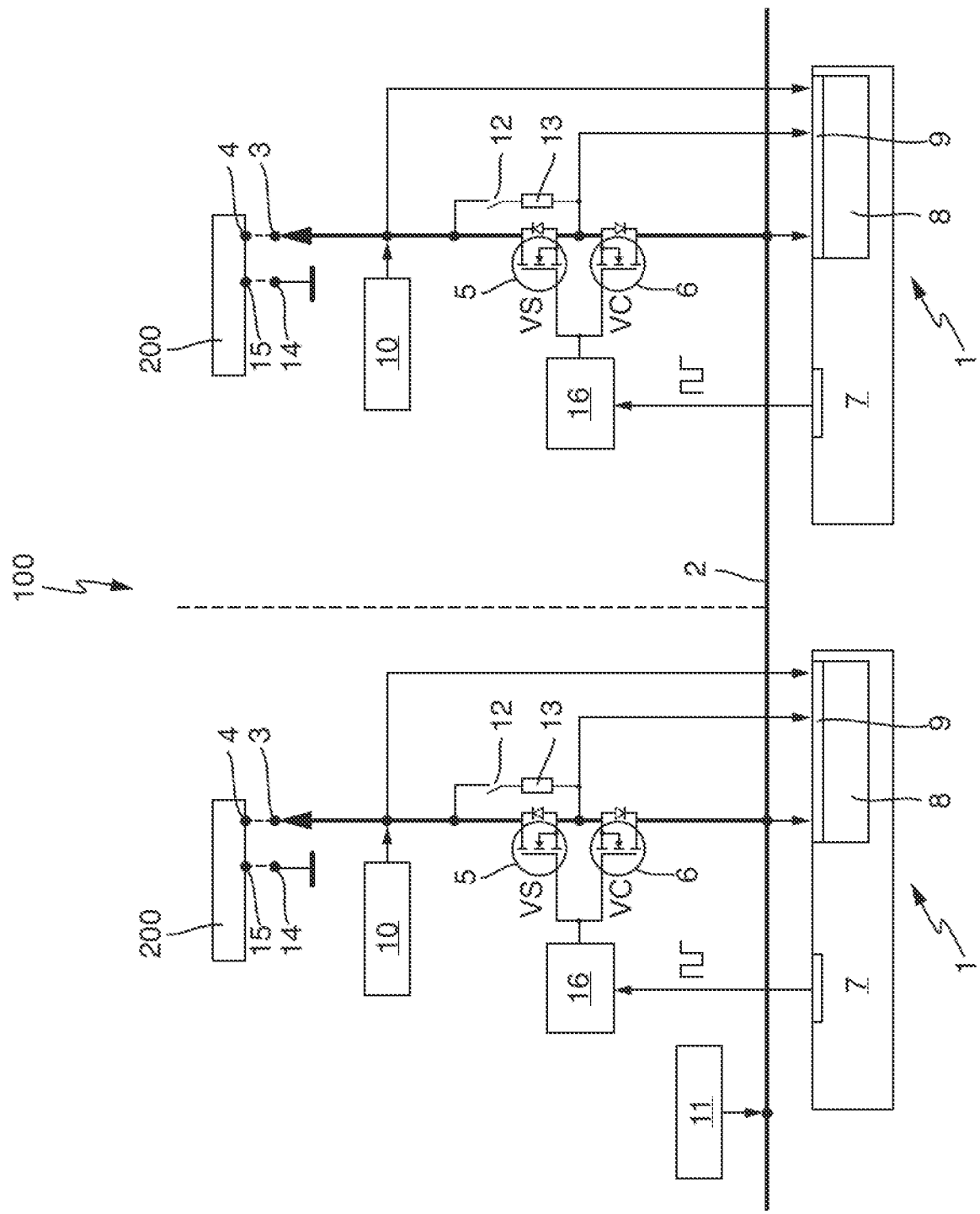

CHARGER

CROSS REFERENCE TO RELATED APPLICATION

This application claims priority under 35 U.S.C. § 119 from European Patent Application No. 21154433.3, filed Jan. 29, 2021, the entire disclosure of which is herein expressly incorporated by reference.

BACKGROUND AND SUMMARY OF THE INVENTION

The invention is based on the object of providing a charger with a plurality of electrical interfaces, which has great operational reliability and which is producible in cost-effective fashion.

The charger comprises a plurality of electrical interfaces or so-called charge slots. By way of example, the charger may comprise between two and eight interfaces or charge slots.

When used as intended, a respective electrical interface is able to be coupled to an electrical energy store to be charged, for example in the form of a rechargeable battery, for the purposes of charging the electrical energy store to be charged.

Further, the charger comprises a common electrical charge line which carries a charging potential, in particular a positive charging potential in relation to a reference potential, during the charging operation of the charger.

A respective electrical interface includes a first connection terminal which, when used as intended, is to be electrically connected to a corresponding first connection terminal of an electrical energy store to be charged. Typically, a respective electrical interface further includes a second connection terminal which, when used as intended, is to be electrically connected to a corresponding second connection terminal of the electrical energy store to be charged. Typically, a higher potential is applied to the first connection terminal than to the second connection terminal. A potential difference between first and second connection terminal typically is the charging voltage, which for example may be in a voltage range between 5 V and 80 V.

A respective electrical interface further includes exactly two field-effect transistors, which are in anti-serial fashion connected between the first connection terminal and the common charge line, without or together with further electrical components.

The charger further comprises at least one control unit, for example in the form of a microprocessor. The control unit is designed to drive the two field-effect transistors of a respective electrical interface in such a way that, at any one time, the first connection terminal of only a single one of the electrical interfaces is connected to the common charge line via its two field-effect transistors in order to prevent a short circuit between a plurality of electrical energy stores to be charged. The charger can comprise a single control unit which controls the operation of all interfaces. Alternatively, each interface can include its own control unit which controls the operation of the associated interface, wherein the control units may be interconnected in order to synchronize the operation of the control units.

In an embodiment, a respective electrical interface further includes a test device which is designed to check the correct switching function of the two field-effect transistors. The test device can be embodied in software and/or hardware.

In an embodiment, the test device has a voltage measuring device which is designed to measure a voltage at a connection node of the two field-effect transistors. The test device is embodied to compare a measured voltage to an expected voltage, wherein the expected voltage should set-in in the case of a correct switching function of the two field-effect transistors and a specified switching state of the two field-effect transistors at the connection node. A correct switching function of the two field-effect transistors is determined if the measured voltage corresponds to the voltage to be expected. The voltage to be expected can be an absolute voltage value or else correspond to a voltage ratio.

In an embodiment, the test device has a first test voltage generation device which is designed to apply a first test potential to the first connection terminal, to be precise in particular only if the associated electrical interface is not coupled to an electrical energy store to be charged.

In an embodiment, the charger comprises a second test voltage generation device, which is designed to apply a second test potential to the charge line, to be precise in particular only if the charger generates no charging potential, in particular no positive charging potential, on the common charge line outside of the charging operation of the charger.

The correct generation of the first and/or second test potential can be implemented using a voltage measuring device of the charger, which is provided to this end.

In an embodiment, the expected voltage is 0 volts if both field-effect transistors of a respective interface are open.

In an embodiment, the test device has a driveable switching means and a test resistor, wherein the driveable switching means and the test resistor are looped-in in series between the first connection terminal and the connection node of the two field-effect transistors.

In an embodiment, the test device is designed to close the driveable switching means during a test and when both field-effect transistors are open, with the expected voltage then depending on the voltage present at the first connection terminal, for example corresponding to the voltage present at the first connection terminal.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a block diagram of a charger according to an embodiment of the invention with a plurality of electrical interfaces, wherein a respective electrical interface is able to be coupled to an electrical energy store to be charged, for the purposes of charging the energy store.

DETAILED DESCRIPTION OF THE DRAWING

FIG. 1 shows a charger 100 with a plurality of electrical interfaces or charge slots 1, wherein a respective electrical interface 1 is able to be coupled to an electrical energy store 200 to be charged, for example in the form of a rechargeable battery, for the purposes of charging the electrical energy store to be charged. Two interfaces 1 are illustrated in exemplary fashion in the present case. It is understood that the charger 100 may also have more than two interfaces 1, for example four or eight interfaces 1.

To charge the electrical energy store 200, the latter is electrically coupled to the associated interface 1, for example by being inserted into a charge slot of the interface 1. It is understood that the interface 1 may include further components not shown here, for example plug-in connectors, sockets, etc. In this respect, reference is also made to the relevant literature in the art.

Further, the charger comprises a common charge line 2 which carries a positive charging potential in relation to a reference potential during the charging operation of the charger 100.

A respective electrical interface 1 includes a first connection terminal 3 which, when used as intended, is to be electrically connected to a corresponding first connection terminal 4 of an electrical energy store 200 to be charged.

A respective electrical interface 1 further includes a second connection terminal 14 which, when used as intended, is to be electrically connected to a corresponding second connection terminal 15 of the electrical energy store 200 to be charged. By way of example, a reference potential can be output at the second connection terminal 14 such that a suitable charging voltage or suitable charging current is output between the connection terminals 3 and 14.

A respective electrical interface 1 further includes two (MOS) field-effect transistors, that is to say MOSFETs, 5 and 6, which are looped-in in an anti-serial fashion between the first connection terminal 3 and the common charge line 2.

The charger 100 further comprises one control unit 7 per interface 1, which control unit is designed to drive the two field-effect transistors 5 and 6 of the associated interface 1 such that, at any one time, the first connection terminal 3 of only a single one of the electrical interfaces 1 is electrically connected to the common charge line 2 via its two field-effect transistors 5 and 6.

As illustrated, each interface 1 has an associated control unit 7. Alternatively, a single control unit may be provided, which controls the operation of all interfaces 1. In this case, the illustrated control units 7 are constituent parts of a common, superordinate control unit and then form individual control unit modules.

The control unit 7 of a respective electrical interface 1 suitably controls the two field-effect transistors 5 and 6 by way of a driver 16 such that said field-effect transistors adopt a desired switching state when functioning correctly.

An electrical interface 1 includes a test device 8 which is designed to check a correct switching function of both field-effect transistors 5 and 6. In the present case, the test device 8 is a constituent part of the control unit 7. However, the test device 8 may also be realized separately from the control unit 7.

The test device 8 has a voltage measuring device 9 which is designed to measure a voltage at a connection node of the two field-effect transistors 5 and 6. The voltage measuring device 9 is further designed to measure a voltage at the connection terminal 3 and a voltage on the common charge line 2.

The test device 8 is designed to compare a voltage measured at the connection node of the two field-effect transistors 5 and 6 with an expected voltage which sets-in at the connection node in the case of a specified switching state of the field-effect transistors 5 and 6. A correct switching function of the two field-effect transistors 5 and 6, a correct switching function of the two field-effect transistors 5 and 6 is determined if the measured voltage corresponds to the expected voltage.

The test device 8 has a further test voltage generation device 10 which is designed to apply a first test potential to the first connection terminal 3 if no electrical energy store 200 is coupled to the corresponding interface 1.

The charger 100 further has a second test voltage generation device 11 which is designed to apply a second test potential to the charge line 2 if no positive charge potential is generated on the common charge line 2 outside of the charging operation of the charger 100.

The test device 8 further has a driveable switching element 12 and a test resistor 13, wherein the driveable switching element 12 and the test resistor 13 are looped-in in series between the first connection terminal 3 and the connection node of the two field-effect transistors 5 and 6.

A typical test procedure is described in more detail below.

To ensure the necessary functional safety, the field-effect transistors 5 and 6 are monitored continuously. To this end, a voltage is measured at the center tap or connection node of the field-effect transistors 5 and 6.

The expected voltage at the connection node of the field-effect transistors 5 and 6 is 0 V for as long as both field-effect transistors 5 and 6 are turned off. If the measured voltage at the connection node of the field-effect transistors 5 and 6 is not 0 V, a fault can be deduced and appropriate corrective action can be introduced, to bring the charger 100 into a safe state.

By way of example, the check is always carried out before charging of an electrical energy store 200 is initiated. Further, the interfaces 1 not currently in charging operation may be checked cyclically. Monitoring an interface 1 in charging operation is not mandatory since its two field-effect transistors 5 and 6 are turned on.

To exclude the case of the voltage measured at the connection node of the field-effect transistors 5 and 6 only therefore being 0 V because no voltage or an identical voltage is present on the node 3 and on the common charge line 2 at that time, the invention ensures that there always is a voltage drop over the series connection of the field-effect transistors 5 and 6 during the check.

Should an energy store 200 be connected to interface 1, said energy store may ensure a suitable potential at the connection terminal 3. This is checked by means of the voltage measuring device 9. If the voltage or the potential is insufficient, for example because no energy store 200 is connected to the interface 1 or the energy store 200 does not generate sufficient voltage, a first test potential is generated at the first connection terminal 3 by capacitive input coupling by means of the first test voltage generation device 10.

During charging operation, the charger 100 provides the charging potential on the common charge line 2. Outside of the charging operation, a second test potential is impressed on the common charge line 2 by means of the second test voltage generation device 11. The test voltages or test potentials generated by means of the first test voltage generation device 10 and the second test voltage generation device 11, respectively, are measured by means of the voltage measuring device 9 and checked in view of whether they are suitable for checking the functionality of the field-effect transistors 5 and 6.

An additional plausibility check is carried out for the voltage measurements at the connection node of the field-effect transistors 5 and 6 in order to ensure the correct functioning of the voltage measurement itself.

To this end, the driveable switching element 12 is closed and hence, with high resistance, a voltage is impressed into the connection node of the field-effect transistors 5 and 6. The impressed voltage is chosen to be so low in this case that no energy store 200 can be charged inadvertently, even in the case of a single fault, that is to say for example a short circuit in another interface 1.

After the switching element 12 is closed, the voltage measured at the connection terminal 3 and the voltage measured at the connection node of the field-effect transistors 5 and 6 are compared to one another. If the comparison does not supply the desired result, an error of the voltage measurement and/or a fault of the field-effect transistors should be assumed and the charger 100 is brought into a safe state. With this, it is possible to ensure that the check of the switching function of the two field-effect transistors 5 and 6 by means of a voltage measurement at the connection node functions correctly.

According to the invention, redundancies can be reduced since, for example, the necessary functional safety can already be obtained by using only two MOSFETs, connected in anti-serial fashion, per interface. As a result of the continuous monitoring according to the invention of the correct function of the MOSFETs, no further switches are required in the charging path.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charger, comprising:
    a plurality of electrical interfaces, wherein a respective electrical interface is able to be coupled to an electrical energy store to be charged, in order to charge the electrical energy store to be charged;
    a common charge line which carries a charging potential during charging operation of the charger,
    wherein a respective electrical interface comprises:
        a first connection terminal which, when used as intended, is to be electrically connected to a corresponding connection terminal of the electrical energy store to be charged,
        two field-effect transistors which are looped-in in anti-serial fashion between the first connection terminal and the common charge line,
        at least one control unit which drives the two field-effect transistors of a respective electrical interface such that, at any one time, the first connection terminal of only a single electrical interface is electrically connected to the common charge line via the two field-effect transistors of the respective interface, and
    a test device designed to check a correct switching function of both of the two field-effect transistors,
    wherein the test device comprises a voltage measuring device designed to measure a voltage at a connection node of the two field-effect transistors, wherein the test device is designed to compare a measured voltage to an expected voltage which sets in at the connection node in the case of a correct switching function of the two field-effect transistors, a correct switching function of the two field-effect transistors being determined when the measured voltage corresponds to the expected voltage, and
    wherein the test device comprises a first test voltage generation device configured to apply a first test potential to the first connection terminal, and/or a second test voltage generation device configured to apply a second test potential to the common charge line.

2. The charger according to claim 1, wherein the expected voltage is 0 V when both of the two field-effect transistors of a respective interface are open.

3. The charger according to claim 1, wherein the test device comprises a driveable switch and a test resistor, wherein the driveable switch and the test resistor are looped-in in series between the first connection terminal and the connection node of the two field-effect transistors.

4. The charger according to claim 3, wherein the test device is designed to close the driveable switch during a test and when both field-effect transistors are open, with the expected voltage then depending on the voltage present at the first connection terminal.

5. The charger according to claim 1, wherein the charging potential is a positive charging potential.

6. The charger according to claim 1, wherein the first test voltage generation device is configured to apply the first test potential to the first connection terminal only when the associated electrical interface is not coupled to an electrical energy store to be charged.

7. The charger according to claim 1, wherein the second test voltage generation device is configured to apply the second test potential to the common charge line only when the charger generates no charging potential on the common charge line outside of the charging operation of the charger.

\* \* \* \* \*